United States Patent
Tandrup

[19]

[11] Patent Number: 5,826,287
[45] Date of Patent: Oct. 27, 1998

[54] INFANT SUPPORT AND POSITIONING SYSTEM

[76] Inventor: Laurie L. Tandrup, P. O. Box 875, Onoway, Alberta, Canada, T0E 1V0

[21] Appl. No.: 895,566

[22] Filed: Jul. 16, 1997

[51] Int. Cl.[6] .............................. A47C 7/02; A47C 31/11; A47D 15/00
[52] U.S. Cl. ............................ 5/655; 5/922; 297/219.12; 297/488
[58] Field of Search ................................ 5/655, 653, 922; 297/219.12, 219.1, 485, 488

[56] References Cited

U.S. PATENT DOCUMENTS

| | | | |
|---|---|---|---|
| 2,734,556 | 2/1956 | Hebrank | 5/653 |
| 4,394,783 | 7/1983 | Simmons | 5/653 |
| 4,630,863 | 12/1986 | Roberts | 297/219.1 |
| 4,695,092 | 9/1987 | Hittie | 297/219.12 |
| 4,892,769 | 1/1990 | Perdelwitz, Jr. et al. | 297/219.12 |
| 5,056,533 | 10/1991 | Solano | 297/219.12 |
| 5,123,699 | 6/1992 | Warburton | 297/485 |
| 5,127,120 | 7/1992 | Mason | 5/655 |
| 5,310,245 | 5/1994 | Lyszczasz | 5/655 |
| 5,354,121 | 10/1994 | Allum | 297/488 |
| 5,586,351 | 12/1996 | Ive | 297/219.12 |
| 5,626,398 | 5/1997 | Wooldridge | 297/488 |

*Primary Examiner*—Alexander Grosz
*Attorney, Agent, or Firm*—Terry M. Gernstein

[57] ABSTRACT

There is provided a modular device for use as a supporting and positioning unit for infants. Three releasably attachable cushions are provided which define a central flat section and flexible rounded side sections. One of the cushions has a harness associated therewith.

4 Claims, 5 Drawing Sheets

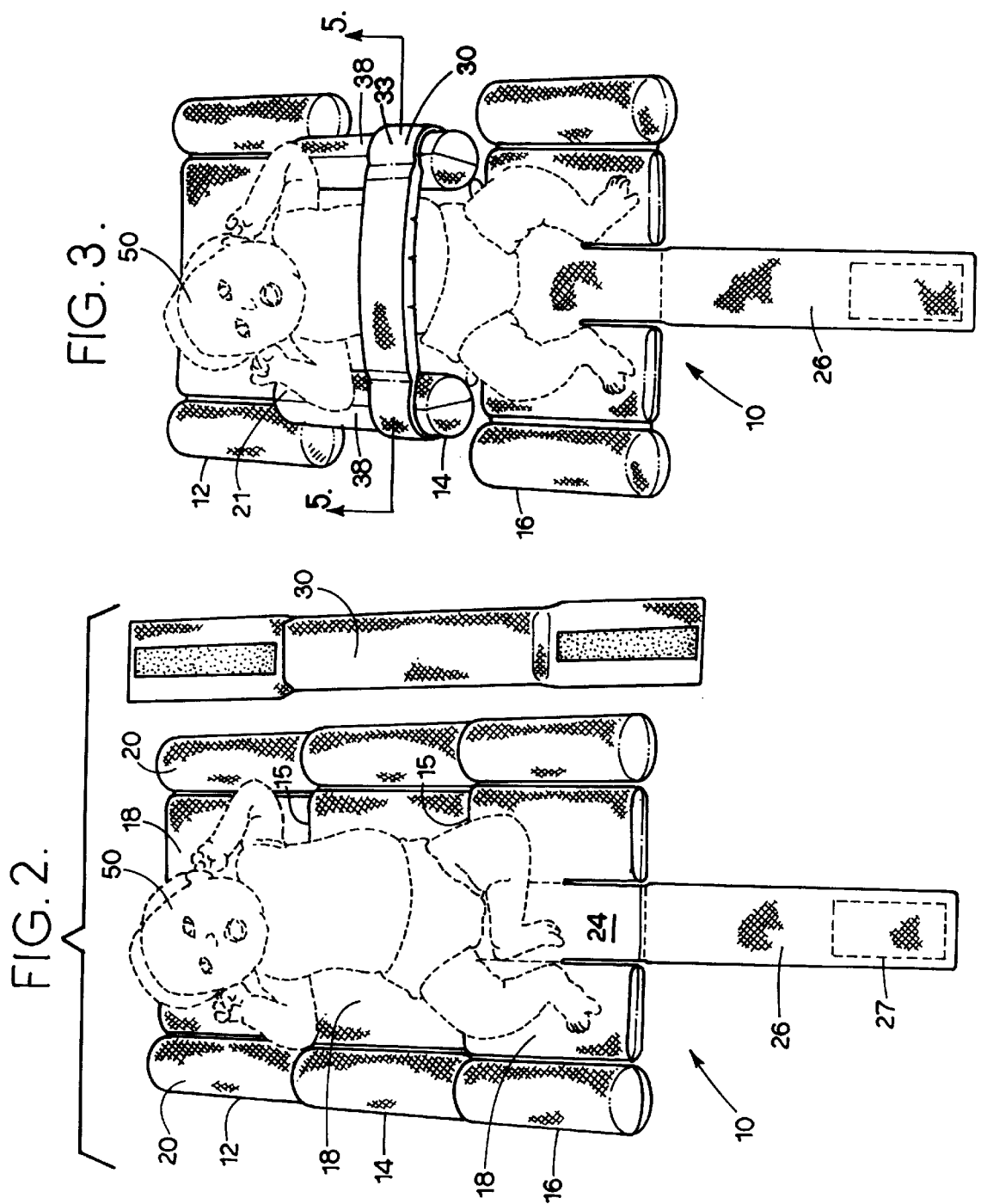

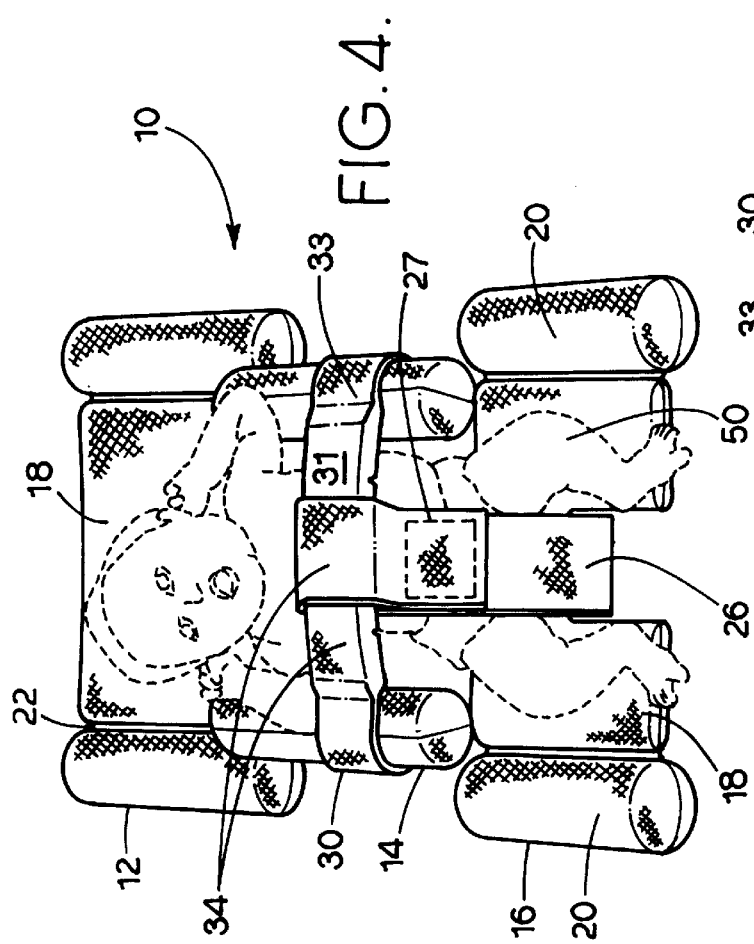
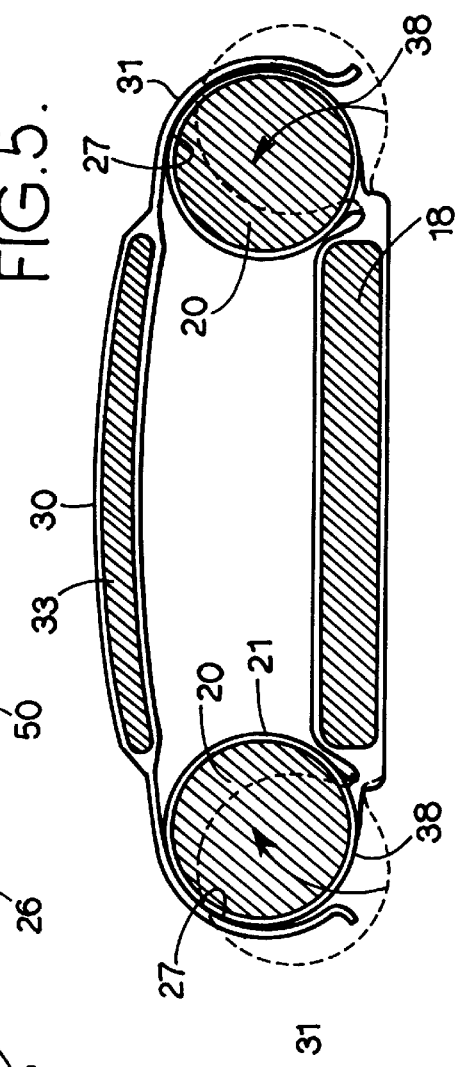

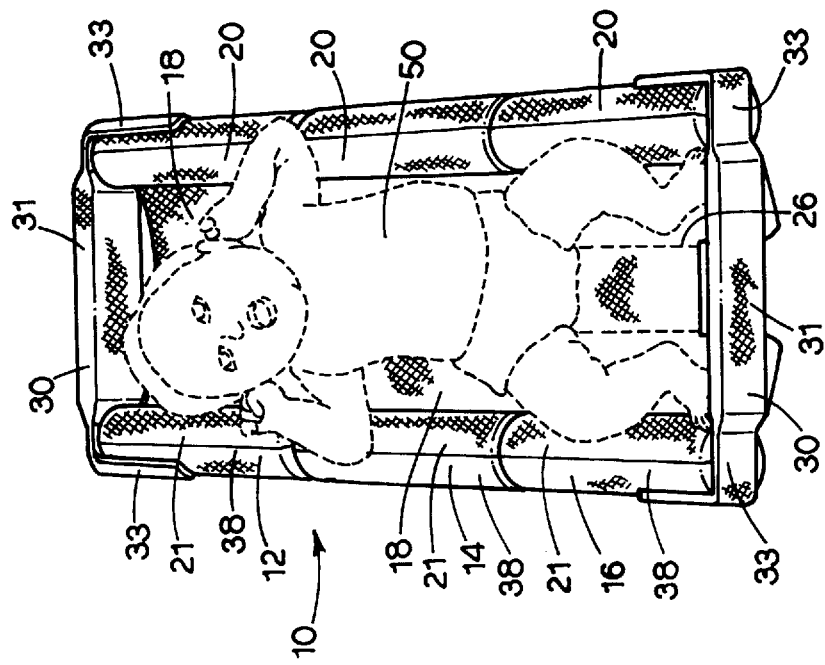
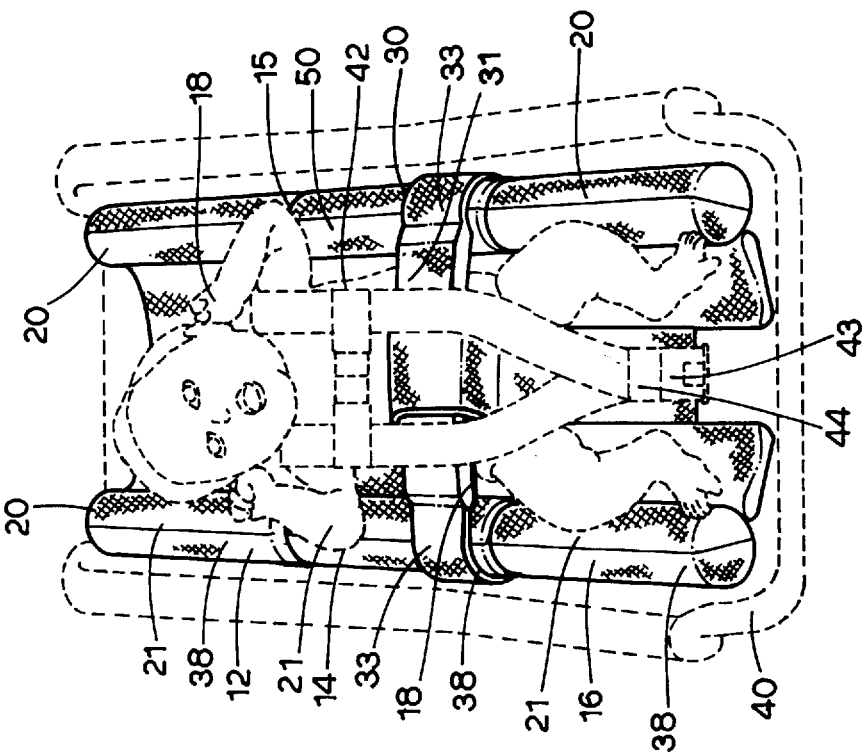

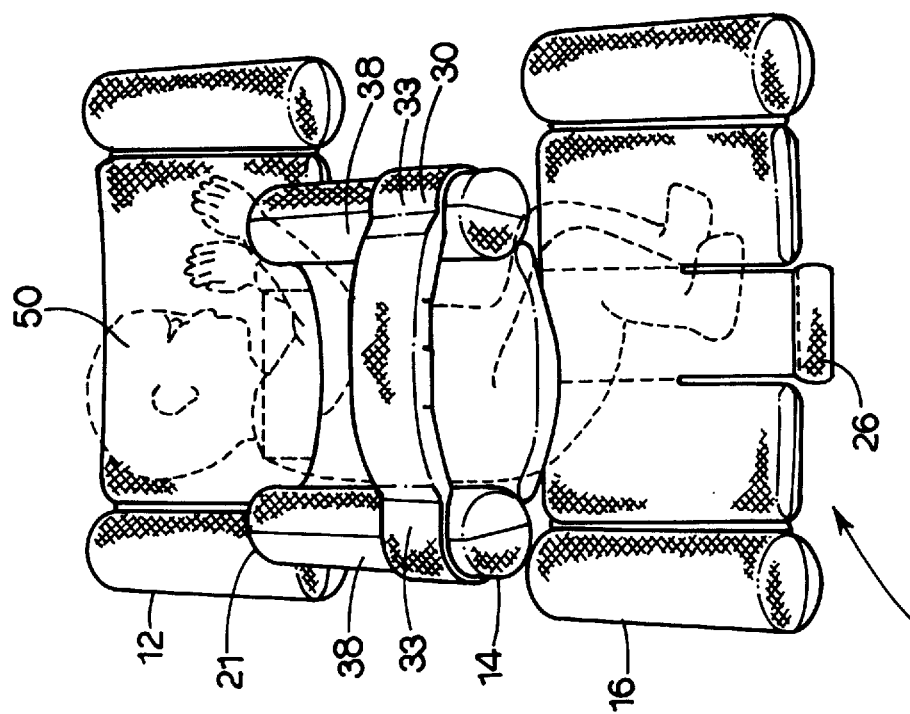
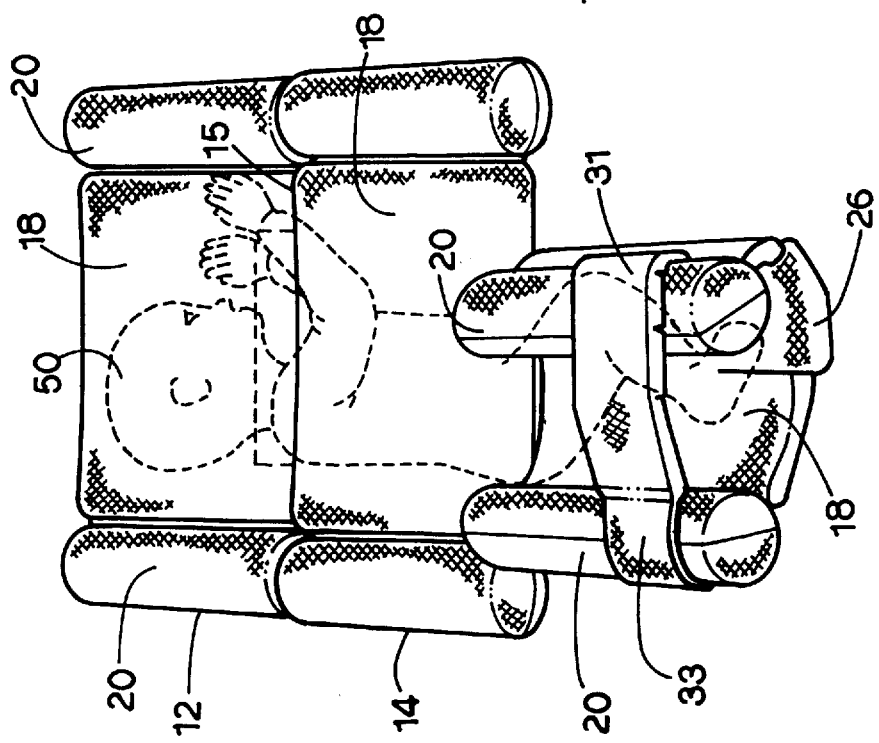

INFANT SUPPORT AND POSITIONING SYSTEM

FIELD OF THE INVENTION

The present invention relates to a modular infant restraint system adapted primarily for use in conjunction with a child's car seat, or similar unit, which is functional to maintain an infant in a predetermined position. The invention finds particular application as a support and restraint for low birth weight low muscle toned or premature infants.

BACKGROUND OF THE INVENTION

It is mandatory that all infants be positioned in children's car seats during travelling. Typically, children, and in particular newborn children, display a tendency to slide downwardly and forward in car seats, which deleteriously results in loss of contact between the child's spine and the car seat back. It is imperative, in the event of an accident, that there be contact between the infant's spine and the car seat back and that they be firmly and correctly positioned therein. Furthermore, in the case of premature or low birth weight infants, who are too small for the presently commercially available children's car seats, it is necessary that padding, exemplary of which would be blankets or the like, must be used in order to position the child in the seat. There is the potential danger, however, of the padding becoming loose, or falling out, during travel and this fact going unnoticed when the seats are facing rearwardly.

U.S. Pat. Nos. 5,224,229 and 5,440,770 disclose infant car seats per se, but to Applicant's best knowledge, there has been no attempt to address the issue of securing a newborn or low birth weight infant within existing children's car seats.

SUMMARY OF THE INVENTION

It is a primary objective of the present invention to provide a support and positioning device adapted to be used in conjunction with a conventional child's car seat to provide the correct positioning required, in particular for low birth weight and newborn infants.

A second objective has been to provide a device, again particularly adapted for placement in a child's car seat, wherein the desired lateral support is provided for a sleeping infant.

Broadly stated the invention is a modular device for placement within a child's car seat to support an infant therein which comprises: first and second cushions releasably attachable one to another whereby pivotal movement therebetween may take place, wherein each cushion defines a substantially flat central portion having generally rounded sections flexibly positioned along the sides thereof, said cushions being formed of a resilient padded material, said cushions further defining a recess therebetween whereby car seat straps may be inserted to thereby secure said infant and device in place.

Advantageously, the device or system of the present invention provides a multi-functional unit, whereby not only is a safe accessory to a child's car seat provided, but the unit may be utilized in a high chair, or stroller, or as a change cushion, or with a travel bed, or as a sleeping nest. It can also be used by a therapist to hold an infant in a predetermined position for treatment or exercise routines for example for adduction or Erb's palsy.

DESCRIPTION OF THE DRAWINGS

The present invention will be better understood with reference to the detailed description herebelow and the attached figures.

FIG. 2 depicts an infant in the support device when the latter is in use as a change bed or the like.

FIG. 3 is illustrative of the device of FIG. 1 with a safety strap in place.

FIG. 4 shows the devices of FIG. 1 with the harness attached.

FIG. 5 is a sectional view of the device of FIG. 1, along line 5—5, shown in FIG. 1.

FIG. 6 is a perspective view of the device of FIG. 1 installed in a car seat.

FIG. 7 is a perspective view of the device of FIG. 1 in use as a sleeping nest.

FIG. 8 is a perspective view of the device of FIG. 1 in use for the purpose of adduction.

FIG. 9 is a perspective view of the device of FIG. 1 being used for side sleeping.

DESCRIPTION OF THE PREFERRED EMBODIMENT

Figure 1:
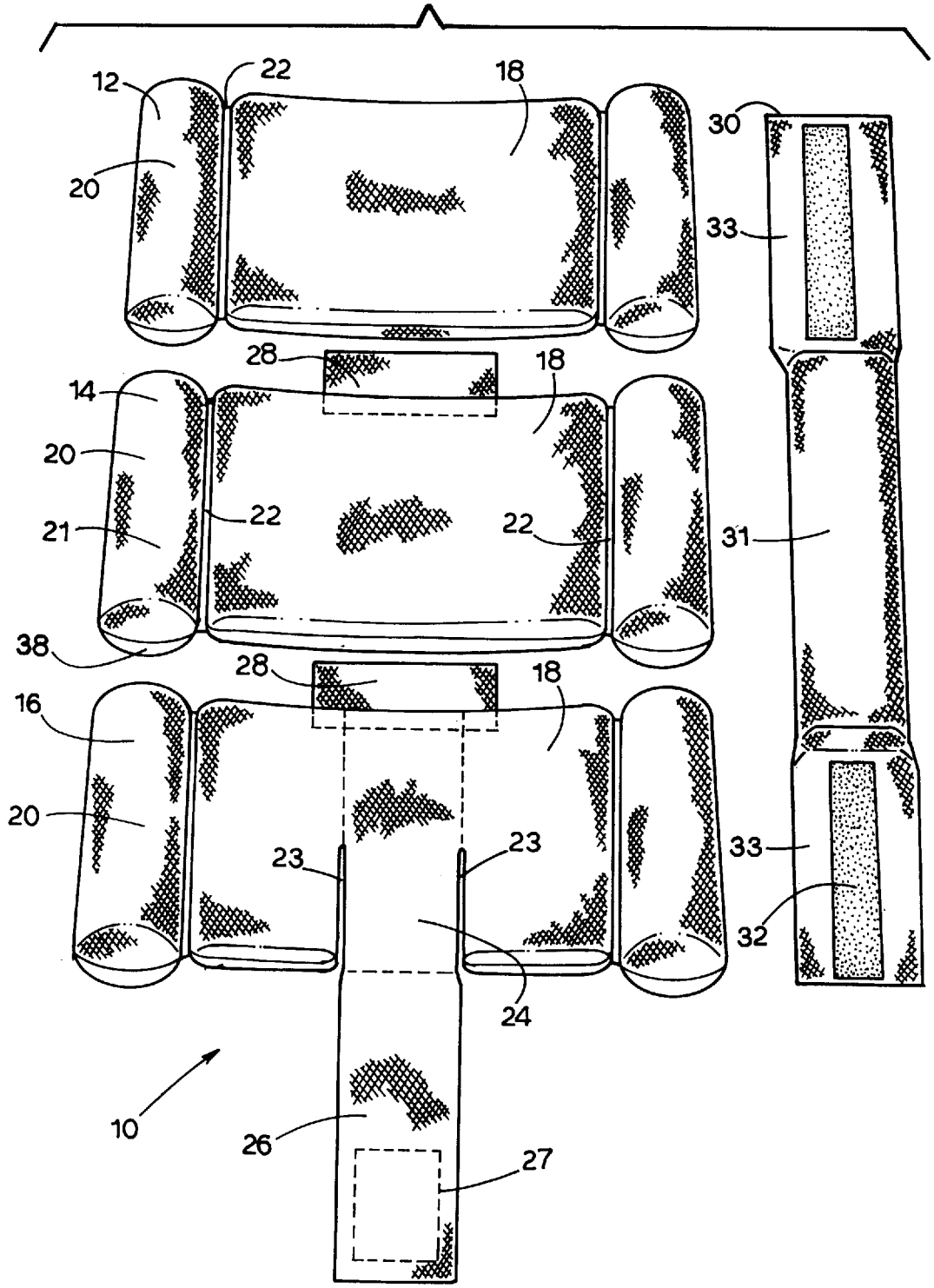
FIG. 1 is an exploded plan view of the infant support system of the present invention.

Having reference to the accompanying drawings, there is shown at 10, the restraint and support device of the instant invention.

The device 10 comprises three foam filled support cushions, a head cushion 12, body cushion 14, and a 'harness' cushion 16 respectively. A recess 15 is defined between said head cushion 12 and body cushion 14 whereby the car seat straps 42 and 43 may be inserted through buckle 44 for securement of said device 10 to said seat 40.

The head cushion 12 and body cushion 14 are substantially identical, and comprise a foam filled central flat section 18 with foam filled generally rounded sections 20 defined along the sides thereof. Generally rounded is to be understood to include inwardly tapering side sections, diamond, triangular or square sections or the like. The seams 22 impart flexibility of movement to the side sections 20.

The harness cushion 16, forming cuts 23 therein, defines at its lower end a cut-away upwardly pivoting portion 24 from which extends a first strap 26. A strip of velcro™ 27 is positioned on the rear of strap 26.

A series of VELCRO strips 28 are used to releasably attach cushions 12, 14, and 16 one to another. Preferably, the material 38 utilized for the rear of the cushions functions as the 'loop' side for the VELCRO strips 28. Alternatively, conventional VELCRO strips may be affixed to the rear of the device as will be evident to one skilled in the art. For the fabric at the front of the unit 21 any suitable material may be selected. The use of VELCRO™ strips 28 permits of a pivotal movement between cushions 12, 14, and 16 as well as adjustment of the distances therebetween.

A safety positioning strap 30, (typically two are provided with the unit) comprising a central padded section 31, and two side fabric sections 33 with VELCRO strips 32 on the rear side thereof is provided. The positioning strap 30 cooperates with the strap 26 and cut-away portion 24, to thereby form harness 34, the VELCRO strips 32 on the strap 30 engaging the rear of cushion 14 to secure harness 34 in place.

As stated earlier, the device extends into a multi-functional unit for use in strollers, on top of a change table or as a bed to provide a unit wherein the child may be prevented from rolling. In the sleeping position the child can be laterally supported by judicious placement of one or more safety straps.

The embodiments in which an exclusive property or privilege are claimed are defined by the claims which now follow:

1. A modular device for placement within a child's seat to support an infant therein which comprises: first and second cushions releasably and pivotally attachable one to another, a third cushion having a harness means associated therewith to further secure an infant within a seat, wherein each cushion defines a substantially flat central section having generally rounded sections flexibly positioned along the sides thereof, said cushions being formed of a resilient padded material, said cushions further defining a recess therebetween whereby seat retaining straps may be inserted to thereby secure said infant and device in place; and at least one releasably attachable safety strap functional to engage the rear of one of said cushions on each side thereof.

2. A modular device for placement within a child's seat to support the infant therein which comprises: first and second cushions releasably and pivotally attachable one to another, wherein each cushion defines a substantially flat central section having generally rounded sections flexibly positioned along the sides thereof, said cushions being formed of a resilient padded material, said cushions further defining a recess therebetween whereby seat retaining straps may be inserted to thereby secure said infant and device in place and wherein one of said cushions has harness means associated therewith to further secure said infant within said seat.

3. A modular device for supporting and restraining an infant which comprises: first and second cushions releasably and pivotally attachable one to another, a third cushion, said third cushion having harness means associated therewith to further secure an infant therewithin, wherein each cushion defines a substantially flat central section having generally rounded sections flexibly positioned along the sides thereof, said cushions being formed of a resilient padded material; and at least one releasably attachable safety strap functional to engage the rear of one of said cushions on each side thereof.

4. A modular device for supporting and restraining an infant therein which comprises: first and second cushions releasably and pivotally attachable one to another, wherein each cushion defines a substantially flat central section having generally rounded sections flexibly positioned along the sides thereof, said cushions being formed of a resilient padded material, wherein one of said cushions has harness means associated therewith to further secure said infant within a seat.

* * * * *